United States Patent [19]

Masuda

[11] Patent Number: 5,013,505
[45] Date of Patent: May 7, 1991

[54] METHOD OF MOLDING A CASING ON A ROTARY ELECTRIC COMPONENT

[75] Inventor: Fumitoshi Masuda, Fukui, Japan

[73] Assignee: Murata Manufacturing Co., Ltd., Japan

[21] Appl. No.: 128,045

[22] Filed: Dec. 3, 1987

Related U.S. Application Data

[62] Division of Ser. No. 849,552, Apr. 8, 1986, abandoned.

[30] Foreign Application Priority Data

Apr. 12, 1985 [JP] Japan ................................ 60-78843

[51] Int. Cl.$^5$ .............................................. B29C 45/14
[52] U.S. Cl. .................................. 264/130; 264/242; 264/264; 264/272.18; 264/272.19
[58] Field of Search ............... 264/130, 242, 264, 265, 264/275, 278, 272.18, 272.19, 272.20

[56] References Cited

U.S. PATENT DOCUMENTS

| | | | |
|---|---|---|---|
| 3,051,607 | 8/1962 | Werth | 264/264 |
| 3,259,862 | 7/1966 | Richard | 264/242 |
| 3,271,845 | 9/1966 | Breher | 264/278 |
| 3,722,084 | 3/1973 | Caddock | 264/272.18 |
| 3,869,789 | 3/1975 | Yungblut et al. | 264/272.18 |
| 4,210,832 | 7/1980 | Ascoli | 310/266 |

FOREIGN PATENT DOCUMENTS

| | | | |
|---|---|---|---|
| 7032657 | 8/1977 | Japan | 264/242 |
| 0239920 | 10/1986 | Japan | 264/264 |
| 844356 | 8/1960 | United Kingdom | 264/272.18 |

Primary Examiner—James Lowe
Attorney, Agent, or Firm—Ostrolenk, Faber, Gerb & Soffen

[57] ABSTRACT

The invention is directed to an electronic component including a casing which is formed by molding a resin material around the stator and the rotor, the rotor being partially exposed through the casing, wherein at least a portion of the surface of the rotor which is in contact with the casing is subjected to a mold releasing treatment, so that the rotor is freely rotatable with respect to the stator and the casing.

6 Claims, 3 Drawing Sheets

METHOD OF MOLDING A CASING ON A ROTARY ELECTRIC COMPONENT

This is a division of application Ser. No. 849,552, filed Apr. 8, 1986 now abandoned.

BACKGROUND OF THE INVENTION

The present invention generally relates to an electronic component such as a variable resistor or a variable capacitor, which includes a rotor, a stator and a casing.

There has been conventionally known such a variable resistor of the type referred to above which includes a rotor, a stator and a casing, as shown in FIGS. 4 and 5. In this variable resistor an insulative stator 1 has a resistive member 1a and a collector electrode 1b formed on the surface thereof. A first lead terminal 2 is electrically connected to an end of the resistive member 1a, a second lead terminal 3 to the other end of the resistive member 1a, and a third lead terminal 4 to the collector electrode 1b, respectively.

A slider 5 is arranged to slide on the resistive member 1a and the collector electrode 1b, which slider 5 is secured to a recessed portion formed in the bottom face of a rotor 6. The rotor 6 has a projected portion 6a formed in the upper part thereof to provide a driver groove 6b.

A casing 7 is designed to support the slider 5 secured to the rotor 6, through an O-ring 8, on the stator 1. The projected portion 6a of the rotor 6 is exposed outside of the casing 7 through an opening formed on the upper surface of the casing 7. The rotor 6 is rotatably retained within the casing 7, and, at the same time, the stator 1 is secured to the casing 7 by the employment of resin 9 which is obtained through potting and hardening of such resin as heat-hardening type epoxy resin or the like. Also, the resin 9 serves to increase, the air-tightness of the casing 7.

In the variable resistor having the above-described construction, the rotor 6 is rotated with respect to the stator 1 and the casing 7 by the guidance of the driver groove 6b, with the slider 5 sliding on the resistive member 1a and the collector electrode 1b.

However, the electronic component of the type represented by the above-mentioned variable resistor which has a rotor, a stator and a casing has the following disadvantages. That is, according to the prior art electronic component as described above, it is necessary for the resin 9 to be subjected to potting, which subsequently makes it necessary to permit the resin to harden for some period of time. Moreover, when the electronic component is of a sealed structure, the atmospheric pressure inside the component inevitably rises due to the heating of the resin for hardening, thereby sometimes creating holes in the potted resin 9. Furthermore, when the electronic component is small in size, it is difficult to adjust or control the amount of the resin 9 to be subjected to potting.

SUMMARY OF THE INVENTION

Accordingly, a major object of the present invention is to substantially solve the above-described disadvantages inherent in the prior art electronic component, and has for its essential object to provide an improved electronic component having a casing formed through molding of a resin in the circumference of a stator and a rotor which is partially exposed outside thereof. In the electronic component of the present invention, at least a portion of the surface of the rotor in contact with the casing is subjected to a mold releasing treatment, so that the rotor is adapted to separate easily from the casing to be freely rotatable with respect to the stator and the casing. Because of the aforementioned construction, the electronic component of the present invention requires no potting operation of the resin, and with ensures good sealing of the component.

BRIEF DESCRIPTION OF THE DRAWINGS

This and other objects and features of the present invention will become apparent from the following description taken in conjunction with one preferred embodiment thereof with reference to the accompanying drawings, in which.

DESCRIPTION OF THE EMBODIMENT

Figure 1:
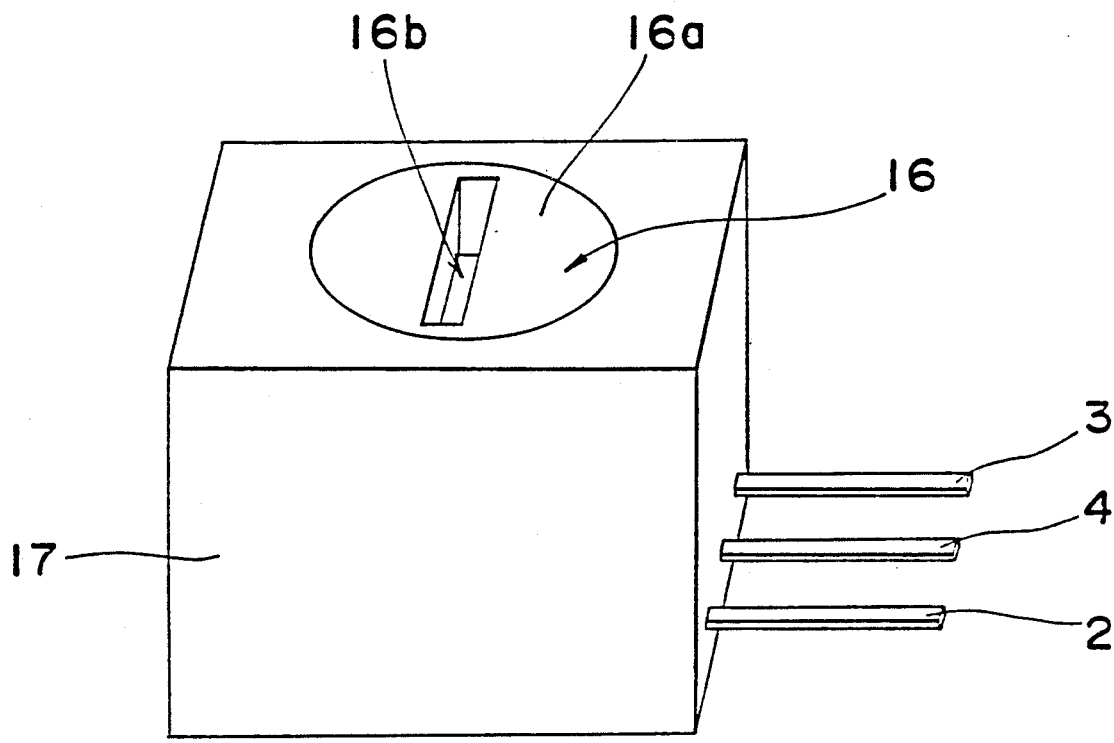
FIG. 1 is a perspective view of a variable resistor according to one preferred embodiment of the present invention.

Before the description of the present invention proceeds, it is to be noted here that like parts are designated by like reference numerals throughout the accompanying drawings.

Figure 2:
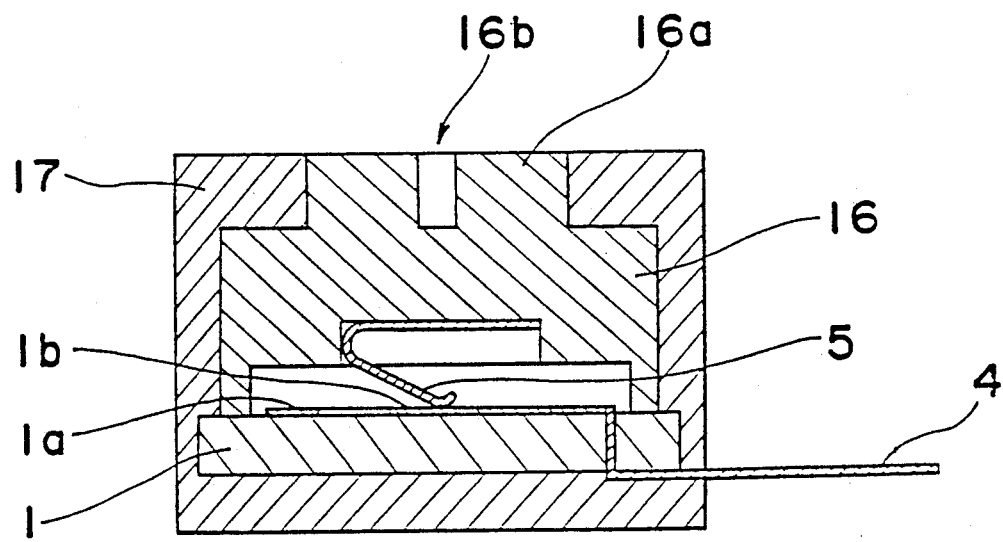
FIG. 2 is a side sectional view of the variable resistor of FIG. 1.

Referring now to FIGS. 1 and 2, there is shown, for example, a variable resistor embodying an electronic component according to the present invention.

In the variable resistor, the surface of a rotor 16 is subjected to a mold releasing treatment to prevent the rotor 16 from adhering to a casing 17 which is molded resin (as described below), and accordingly, it is sufficient that the mold releasing treatment is performed at least partially on the surface of the rotor 16 which will be in contact with the casing 17. By way of example, the mold releasing treatment, may comprise the application of parting agent material to the surface of the rotor 16 so as to prevent the rotor 16 from being adhered to the casing 17, or subjecting the surface of the rotor 16 to heat treatment. A projected portion 16a is formed in the upper part of the rotor 16, while a recessed portion 16b defines a driver groove formed in the projected portion 16a.

Resin is molded with inner dimensions approximately equal to the outer dimensions of rotor 16 and stator 1 so as to form the casing 17 through which a part of the rotor 16 is exposed outside. Since at least a portion of the surface of the rotor 16 which is to be in contact with the casing 17 is subjected to the mold releasing treatment, the rotor 16 is rotated free from the stator 1 and, the casing 17, without being adhered to the casing 17. If the rotor 16 is made of resinous material, it is preferably made of material having a heat-proof property equivalent to or superior to that of the resin of the casing 17.

Figure 3:
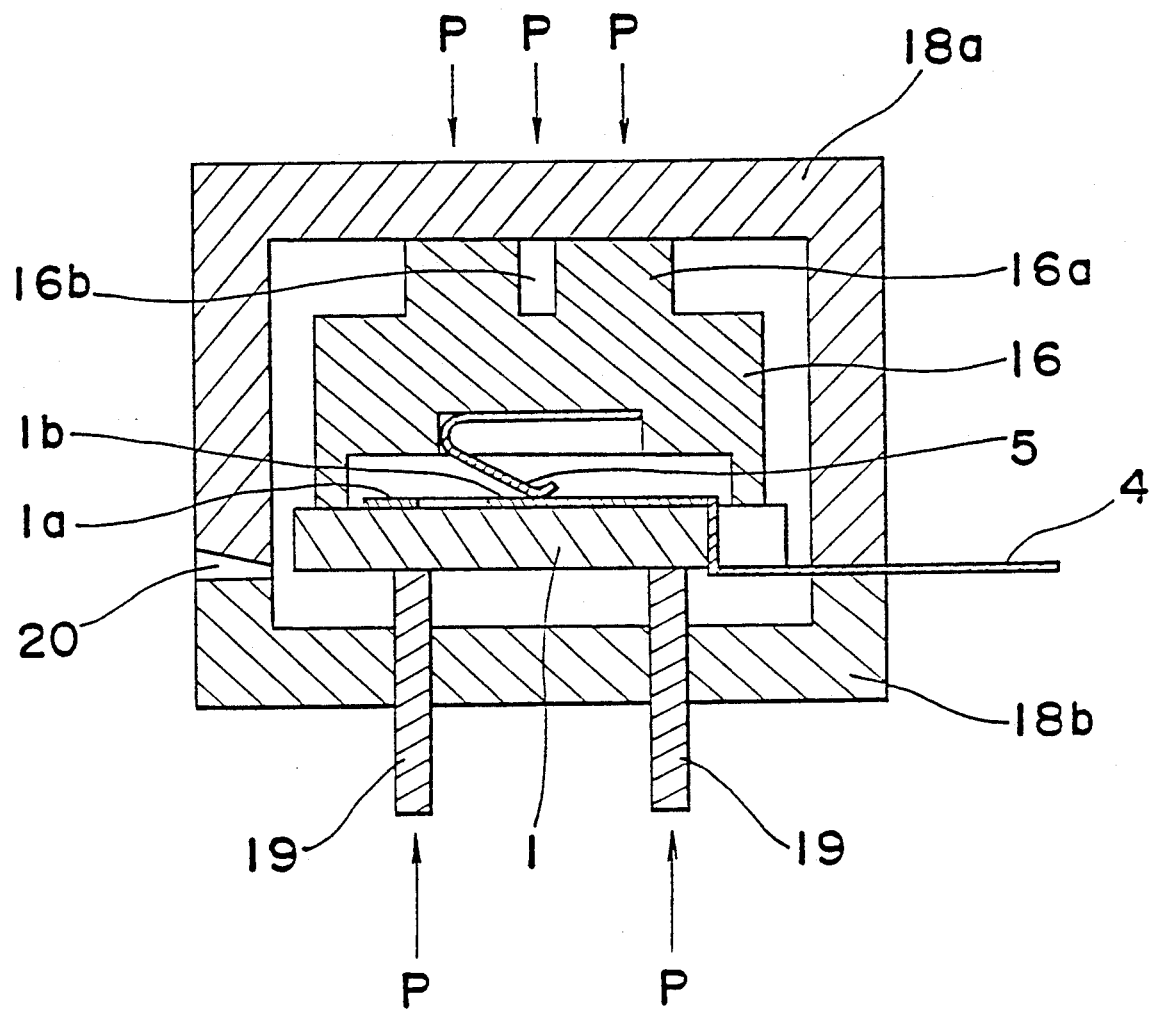
FIG. 3 is a side sectional view of the variable resistor of FIG. 1, explanatory of one example of manufacturing methods therefor.
Figure 4:
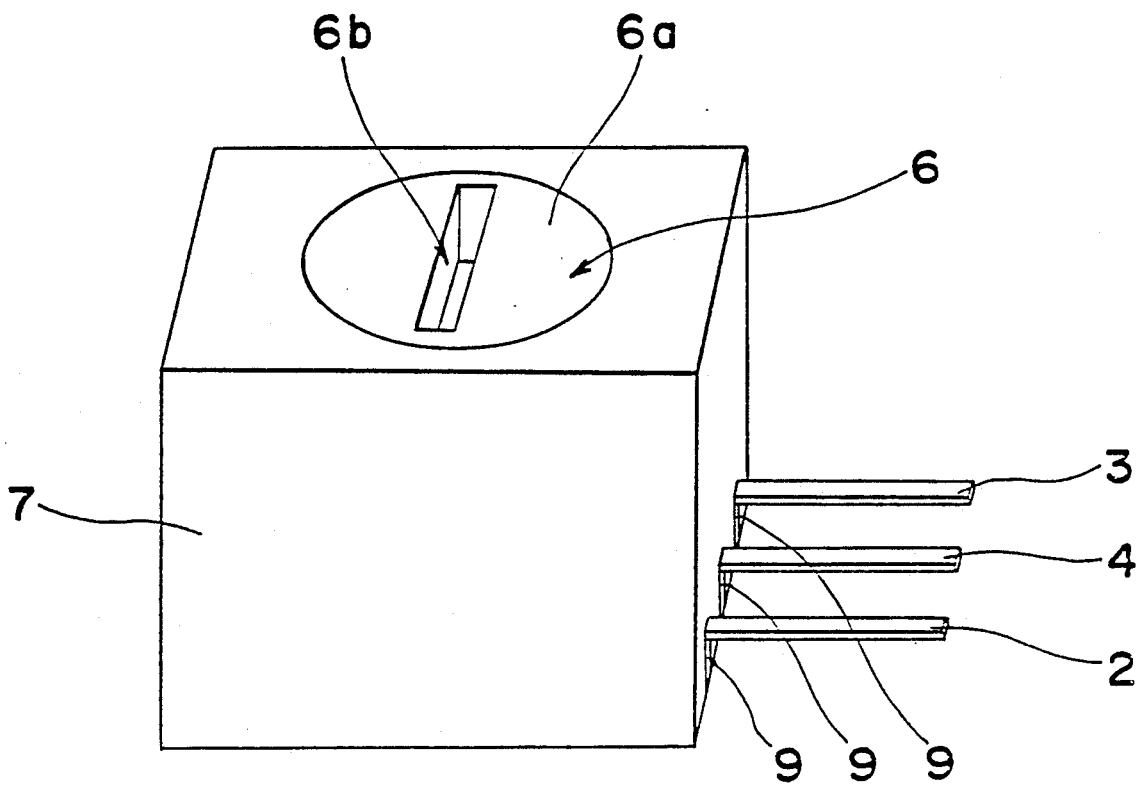
FIG. 4 is a perspective view of a prior art variable resistor.
Figure 5:
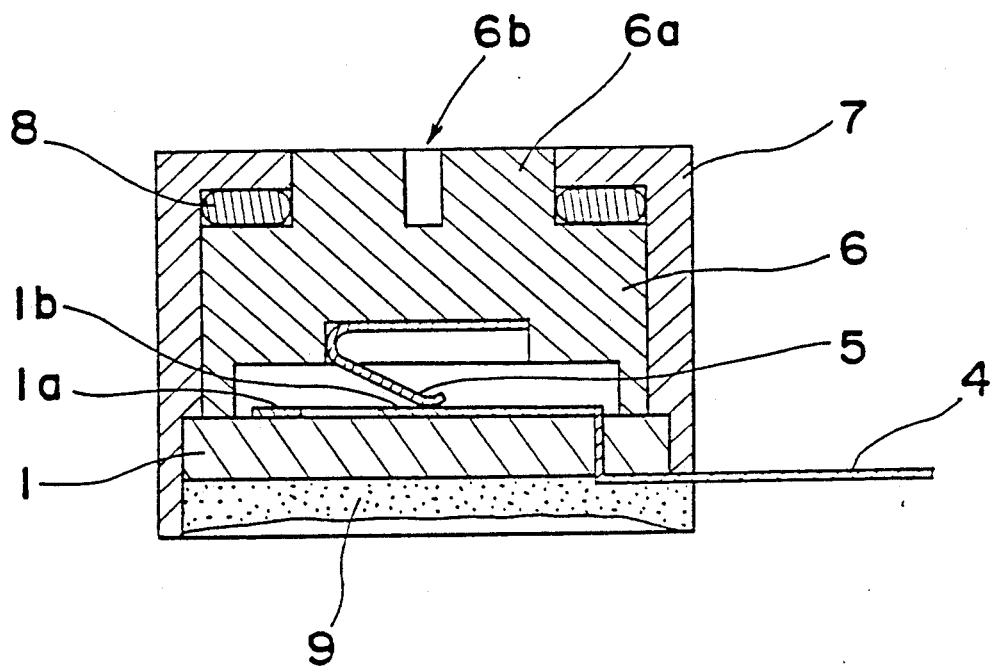
FIG. 5 is a side sectional view of the prior art variable resistor of FIG. 4.

As shown in FIG. 3, in order to mold the casing 17 with a resin material the stator 1 and the rotor 16 are fixedly positioned within a mold 18a and is applied to the mold and to fixing pins 19 (indicated by an arrow P), and then, a melted resin is injected, through a gate 20, into the molds 18a and 18b to be hardened to form the casing 17. The stator 1 is tightly pressed into contact with the rotor 16 owing to the pressure applied to fixing pins 19, and accordingly there is no possibility that the resin will invade the space between the stator 1 and the rotor 16.

The foregoing description indicates one preferred embodiment of a variable resistor embodying the electronic component according to the present invention, and it is needless to say that the variable resistor may be modified in various ways within the scope of the invention. For example, it may be so arranged that a rubber packing is printed on or attached to a portion of the stator 1 where it is come into contact with the rotor 6 such that the resin for molding the casing 17 is prevented from invading into the space between the stator 1 and the rotor 6. Moreover, the formation method of the casing 17 illustrated in FIG. 3 is one example, and therefore, it is not restricted to this method. Although the present invention has been described with reference to a variable resistor in the above-described embodiment, the present invention is not limited to the variable resistor, but may be any electronic component as long as it includes a rotor, a stator and a casing. Accordingly, a variable capacitor, etc, is included in the present invention.

As is clear from the foregoing embodiment, according to the present invention, the electronic component is so designed that a casing is formed by molding a resin around the stator and the rotor with the rotor being partially exposed outside, and at least a portion on the surface of the rotor which will be in contact with the casing is subjected to a mold releasing treatment so that the rotor is freely rotatable with respect to the stator and the casing. As a result, it is not necessary to pot the bottom of the casing as is required in the prior art electronic component. This reduces the time to be spent for hardening the resin and improves productivity of the electronic component as a whole. In addition, the number of component parts can be reduced.

Further, according to the present invention, the electronic component can be manufactured on a mass-production line by an automatic device, with the lead terminal led out of the stator being hooped.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A method of manufacturing an electronic component, said method comprising the steps of:
   supporting a stator and a rotor in a mold;
   pouring a resin material into said mold, the shape of said mold and the locations of said stator and rotor being such that said resin material fully encloses said stator and encloses all but one exposed portion of said rotor so as to form a unitary molded casing which houses said stator and rotor, said one exposed portion of said rotor being exposed to the outside of the casing;
   urging said mold against said part of said rotor to be exposed; and urging said stator against said rotor; so that said resin material will enter neither between said exposed rotor part and said mold, nor between said rotor and stator; and
   subjecting at least a portion of the surface of said rotor which will be in contact with said casing to a mold releasing treatment so that the rotor is freely rotatable with respect to both the stator and the casing after the molding is completed.

2. A method as claimed in claim 1, further comprising the step of providing a rotor which comprises a resin material, and has heat-resistance equal to or greater than that of the resin material which is poured into the mold.

3. A method as claimed in claim 1, wherein said step of supporting the stator and rotor further comprises the following steps:
   disposing said rotor in said mold so that said exposed portion thereof which is to be exposed to the outside is at a first part of said mold;
   providing a fixing device between said stator and a second part of said mold, which is opposite to said first part, for applying a fixing pressure to urge said stator away from said second part of said mold; and
   employing said fixing device to apply said fixing pressure to said stator to urge said stator against said rotor; and applying further pressure to urge said first part of said mold against said exposed part of said stator, so that said resin material will enter neither between said exposed rotor part and said mold, nor between said rotor and stator.

4. A method of manufacturing an electronic component, said method comprising the steps of:
   supporting a stator and a rotor in a mold; and
   pouring a resin material into said mold, the shape of said mold and the locations of said stator and rotor being such that said resin material fully encloses said stator and encloses all but one exposed portion of said rotor so as to form a unitary molded casing which houses said stator and rotor, said one exposed portion of said rotor being exposed to the outside of said casing;
   urging said mold against said part of said rotor to be exposed; and urging said stator against said rotor; so that said resin material will enter neither between said exposed rotor part and said mold, nor between said rotor and stator; and
   subjecting at least a portion of the surface of said rotor which will be in contact with said casing to a mold releasing treatment so that the rotor is freely rotatable with respect to both the stator and the casing after the molding is completed; wherein said mold releasing treatment is an application of a parting agent applied to said surface of said rotor.

5. A method as claimed in claim 4, further comprising the step of providing a rotor which comprises a resin material, and has heat-resistance equal to or greater than that of the resin material which is poured into the mold.

6. A method as claimed in claim 4, wherein said step of supporting the stator and rotor further comprises the following steps:
   disposing said rotor in said mold so that said exposed portion thereof which is to be exposed to the outside is at a first part of said mold;
   providing a fixing device between said stator and a second part of said mold, which is opposite to said first part, for applying a fixing pressure to urge said stator away from said second part of said mold; and
   employing said fixing device to apply said fixing pressure to said stator to urge said stator against said rotor; and applying further pressure to urge said first part of said mold against said exposed part of said stator, so that said resin material will enter neither between said exposed rotor part and said mold, nor between said rotor and stator.

* * * * *